(12) United States Patent
Xiao et al.

(10) Patent No.: US 11,119,002 B2
(45) Date of Patent: Sep. 14, 2021

(54) EXPERIMENTAL APPARATUS FOR SIMULATING LIFTING OPERATION OF DEEP-SEA MINING

(71) Applicant: SHANDONG UNIVERSITY OF SCIENCE AND TECHNOLOGY, Qingdao (CN)

(72) Inventors: Linjing Xiao, Qingdao (CN); Qinghui Song, Qingdao (CN); Yulong Zhang, Qingdao (CN); Yu Wang, Qingdao (CN); Shuai Zuo, Qingdao (CN); Qiang Liu, Qingdao (CN)

(73) Assignee: SHANDONG UNIVERSITY OF SCIENCE AND TECHNOLOGY, Qingdao (CN)

( * ) Notice: Subject to any disclaimer, the term of this patent is extended or adjusted under 35 U.S.C. 154(b) by 142 days.

(21) Appl. No.: 16/603,972

(22) PCT Filed: Dec. 24, 2018

(86) PCT No.: PCT/CN2018/122999
§ 371 (c)(1),
(2) Date: Oct. 9, 2019

(87) PCT Pub. No.: WO2020/073498
PCT Pub. Date: Apr. 16, 2020

(65) Prior Publication Data
US 2021/0087919 A1    Mar. 25, 2021

(30) Foreign Application Priority Data
Oct. 12, 2018 (CN) .......................... 201811187580.4

(51) Int. Cl.
*G01M 10/00* (2006.01)
*F04D 35/00* (2006.01)

(52) U.S. Cl.
CPC ............. *G01M 10/00* (2013.01); *F04D 35/00* (2013.01)

(58) Field of Classification Search
CPC .............................. G01M 10/00; F04D 35/00
See application file for complete search history.

(56) References Cited

U.S. PATENT DOCUMENTS 4,979,243 A * 12/1990 Teratsuji .............. A63B 69/125
4/488

FOREIGN PATENT DOCUMENTS

| CN | 207231750 U | 4/2018 |
| CN | 108344389 A | 7/2018 |
| JP | 2004150982 A * | 5/2004 |

OTHER PUBLICATIONS

International search report dated Jul. 10, 2019 from corresponding application No. PCT/CN2018/122999.

(Continued)

*Primary Examiner* — Paul M. West
(74) *Attorney, Agent, or Firm* — Hauptman Ham, LLP

(57) ABSTRACT

Provided is an experimental apparatus for simulating lifting operation of deep-sea mining, which relates to the technical field of experimental equipment of deep-sea mining. By this apparatus, dynamic characteristics of a spatial structure when simulating lifting operation of deep-sea mining are solved. The apparatus includes an experimental box, a wave-making mechanism, a flowrate control mechanism, a mining simulation mechanism and a monitoring mechanism. The wave-making mechanism includes a control box and a wave-pushing board for simulating waves. The flowrate control mechanism includes a water pump, a motor, a grating board and a manifold so that the flowrate and the flow volume can be adjusted by the grating board and the manifold. The mining simulation mechanism includes an experimental ship model, a lifting pipe, a material-mixing (Continued)

pipe, a mineral slurry pipe, a material-delivering pipe and a material-returning pipe for simulating lifting operation states. The monitoring mechanism includes a wave height measurer, a displacement sensor, a flowrate measurer and an image collection apparatus for detecting dynamic influence of the wave height and the wave speed on the mining simulation mechanism during a mining process, especially during lifting operation. Further, the apparatus has advantages such as multi-parameter real-time monitoring, low fabrication cost and simple operation.

8 Claims, 3 Drawing Sheets

(56) References Cited

OTHER PUBLICATIONS

Written Opinion dated Jul. 10, 2019 from corresponding application No. PCT/CN2018/122999.
First search report dated Apr. 9, 2019 from corresponding application No. CN 201811187580.4.
Office Action dated Apr. 17, 2019 from corresponding application No. CN 201811187580.4.

* cited by examiner

EXPERIMENTAL APPARATUS FOR SIMULATING LIFTING OPERATION OF DEEP-SEA MINING

RELATED APPLICATIONS

The present application is a U.S. National Phase of International Application Number PCT/CN2018/122999 filed Dec. 24, 2018 and claims priority to Chinese Application Number 201811187580.4, filed Oct. 12, 2018.

TECHNICAL FIELD

The present disclosure relates to the field of deep-sea mining experiment device, and in particular to an experimental apparatus for simulating lifting operation of deep-sea mining.

BACKGROUND

Along with increasing depletion of terrestrial resources, mining mineral resources deposited in deep sea becomes increasingly important. In addition to marine petroleum gas and beach mineral sands, seabed also deposits rich metal mineral resources such as polymetallic nodules, cobalt-rich crusts and polymetallic sulfides and so on. These minerals are rich in many elements such as nickel, cobalt, copper, manganese, gold and silver. Developing and utilizing marine metal mineral resources has become a necessary trend. China Manufacturing 2025 Program classifies "deep sea engineering equipment and high-tech ships" as one of top 10 strategic fields to break through, which calls for further experiment and development of advanced marine engineering equipment.

An existing deep-sea mining system mainly includes a mother ship, a lifting hard pipe, a miner and so on. A lifting system for lifting mineral resources from a seabed mining system to a surface mother ship is an important object to be studied. The lifting system of deep sea mining is affected by complex marine environments. Several thousand meters of transporting pipe is subjected not only to complex marine environmental loads such as winds, waves and water currents but also to heaves, swings and drifts and so on of a surface mining ship. The miner is connected with the lifting hard pipe through a hose pipe. A motion range and a motion trajectory of the miner may be determined reasonably based on spatial offset position of the lifting hard pipe and mining technique. It is of extremely important theoretical significance and application value for safety, reliability, use life and mining efficiency of the entire system to research on the mining system and especially the dynamic characteristics such as morphology, motion displacement, bearing force, vibration and so on of the lifting hard pipe and analyze inherent characteristics of system vibration under complex conditions. Therefore, it is very significant to develop an experimental apparatus for simulating lifting operation of deep-sea mining environment, which will greatly pushes the scientific progress and engineering technology development of the field.

For actual engineering, it is very significant to analyze morphology, motion displacement, bearing force and vibration and so on of a lifting pipe under conditions of different sea waves and sea currents by simulating deep-sea operation site environment and lifting operation process with an experimental apparatus. The experimental apparatus can control a wave length, a wave height and a water flow rate and a water flow volume, and simulate lifting operation states, thereby realizing integrated multi-parameter detection of mining operation.

SUMMARY

To solve the technical problem of dynamic characteristics of a spatial structure when simulating lifting operation of deep-sea mining, an example of the present disclosure provides an experimental apparatus for simulating lifting operation of deep-sea mining. The technical solution is described as follows.

An experimental apparatus for simulating lifting operation of deep-sea mining includes: an experimental box, a wave-making mechanism, a flowrate control mechanism, a mining simulation mechanism and a monitoring mechanism. The wave-making mechanism includes a control box and a wave-pushing board and the wave-pushing board is disposed at a side wall of an upper portion of the experimental box, and the control box is connected with the wave-pushing board through a coupling. The flowrate control mechanism includes a water pump, a motor, a grating board and a manifold, the manifold includes an inlet manifold and an outlet manifold and the grating board is disposed close to a branch surface of the manifold. The mining simulation mechanism includes an experimental ship model, a lifting pipe, a material-mixing box, a mineral slurry pipe, an intermediate bin, a material-delivering pipe and a material-returning pipe. The material-delivering pipe includes a material-delivering hard pipe and a material-delivery hose. The lifting pipe is disposed between the experimental ship model and the intermediate bin, the mineral slurry pump is connected with the material-mixing box through the material-delivering hard pipe, and the material-returning pipe is disposed between the material-mixing box and the experimental ship model. An end of the material-delivering hose is connected with the mineral slurry pump, and the material-delivering pipe enters the experimental box through a through hole of the experimental box and connects with the intermediate bin. The monitoring mechanism includes a wave height measurer, a displacement sensor, a flowrate measurer and an image collection apparatus, and the flowrate measurer and the displacement sensor are disposed on the intermediate bin.

Preferably, two supports are disposed at the upper portion of the experimental box and a working table is disposed on the support; the control box, the material-mixing box and the mineral slurry pump are all disposed on the working table.

Preferably, a motor, a decelerator and a wave height measurer are disposed in the control box. The motor is connected with the decelerator which is connected with the coupling.

Preferably, the wave height measurer of the monitoring mechanism includes a buoy which is disposed at a liquid level of the experimental box. The wave height measurer may specifically be an optical wave measurer used for measuring and recording a wave height, a wave direction and a period.

Further preferably, two image collection apparatuses of the monitoring mechanism are disposed and the image collection apparatus is fixed at an inner side of the experimental box.

Preferably, a mixer is disposed in the material-mixing box of the mining simulation mechanism, and a discharge opening at a lower portion of the material-mixing box is connected with the material-delivering hard pipe. The experimental ship model is hinged with the lifting pipe and the lifting pipe is connected with the material-returning pipe through the experimental ship model.

Preferably, a guideway groove is disposed on both sides of the branch surface of the manifold respectively, a screw structure is arranged in the guideway groove, and the grating board moves along the guideway groove through the screw structure.

Further preferably, the number of the through holes on the grating board is equal to the number of the through holes on the branch surface of the manifold, a diameter of the through hole on the grating board is equal to a diameter of an outlet of a manifold branch, and spacing between edges of the through holes on the grating board is larger than the diameter of the through hole.

The present disclosure has the following beneficial effects.

(1) The experimental apparatus for simulating lifting operation of deep-sea mining simulates waves by the wave-making mechanism so that the influence of waves on the lifting process of the mining may be analyzed. The wave-making mechanism drives the wave-pushing board by use of the decelerator and the coupling and controls the wave height and the wave velocity by adjusting a rotation speed.

(2) The flowrate control mechanism adjusts the flowrate and the flow volume by the grating board and the manifold, that is, controls incoming and outgoing speeds and volumes of water current by blocking the surface of the manifold branch with the grating board, so that sea currents can be effectively simulated. The real time control for sea currents may be realized particularly by controlling the movement of the grating board with the screw structure.

(3) With the experimental ship model, the lifting pipe, the material-mixing box, the mineral slurry pipe, the material-delivering pipe and the material-returning pipe of the mining simulation mechanism, the slurry can be recycled and lifting operation state is well simulated.

Further, the apparatus has advantages such as multi-parameter real-time monitoring, low fabrication cost and simple operation.

Figure 1:
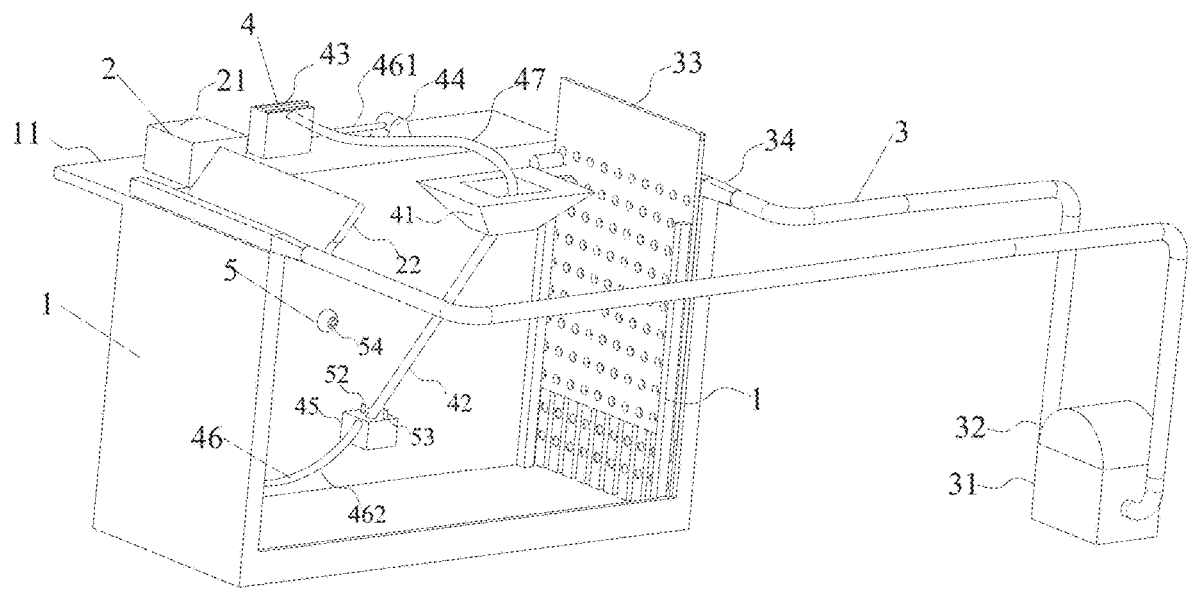
FIG. 1 is a schematic diagram illustrating an entire structure of an experimental apparatus for simulating lifting operation of deep-sea mining according to an example of the present disclosure.
Figure 2:
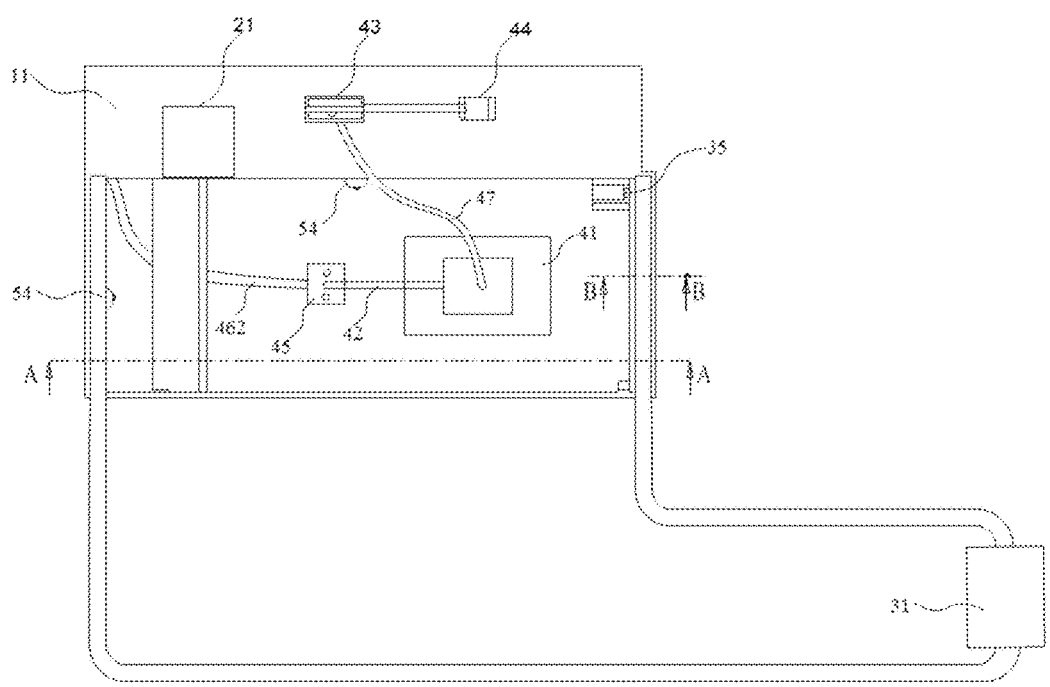
FIG. 2 is a top view illustrating an experimental apparatus for simulating lifting operation of deep-sea mining according to an example of the present disclosure.
Figure 3:
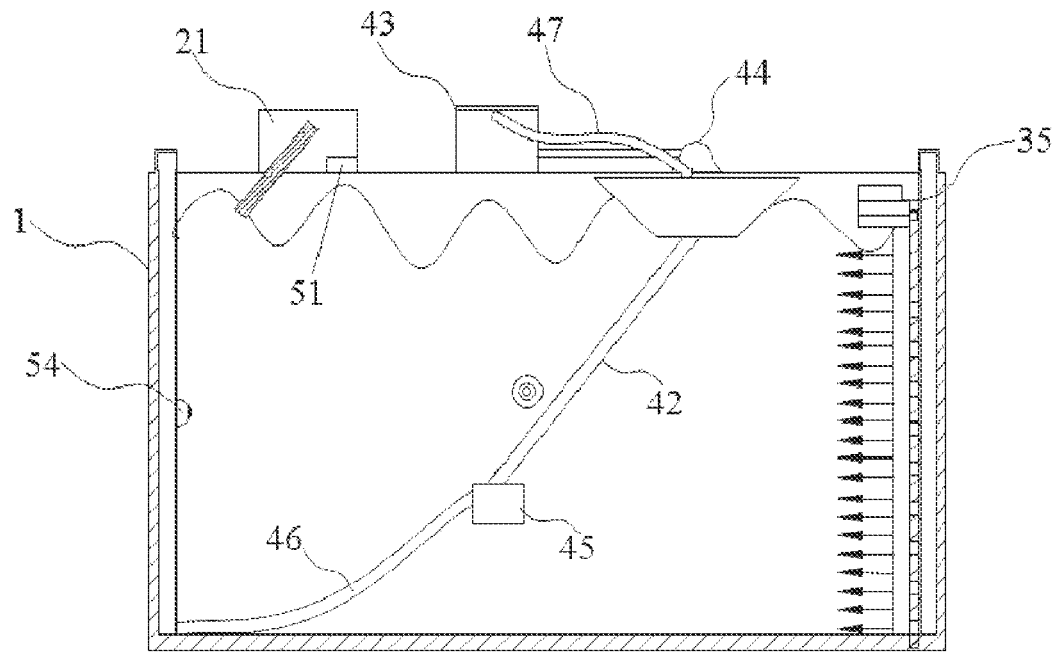
FIG. 3 is a sectional view taken along A-A of an experimental apparatus for simulating lifting operation of deep-sea mining according to an example of the present disclosure.
Figure 4:
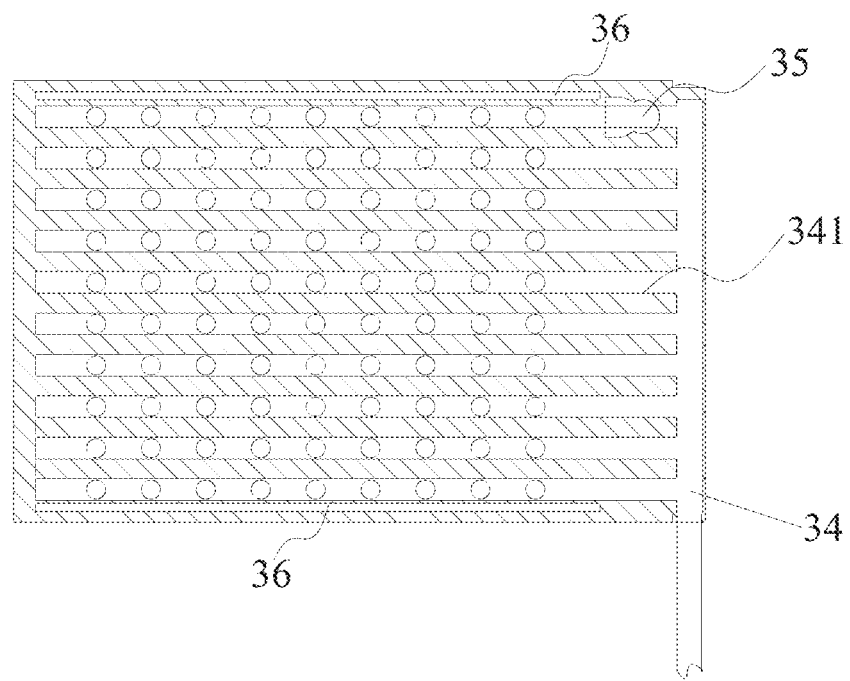
FIG. 4 is a sectional view taken along B-B of an experimental apparatus for simulating lifting operation of deep-sea mining according to an example of the present disclosure.
Figure 5:
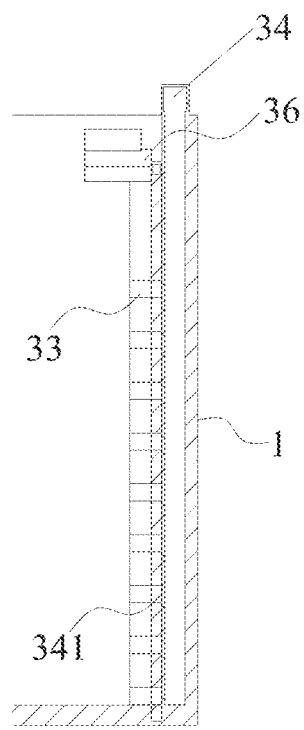
FIG. 5 is a schematic diagram illustrating a structure of a branch surface of a manifold according to an example of the present disclosure.

In the drawings, 1 refers to an experimental box, 11 refers to a working table, 2 refers to a wave-making mechanism, 21 refers to a control box, 22 refers to a wave-pushing board, 3 refers to a flowrate control mechanism, 31 refers to a water pump, 32 refers to a motor, 33 refers to a grating board, 34 refers to a manifold, 341 refers to a manifold branch, 35 refers to a servo motor, 36 refers to a guideway groove, 4 refers to a mining simulation mechanism, 41 refers to an experimental ship model, 42 refers to a lifting pipe, 43 refers to material-mixing box, 44 refers to a mineral slurry pipe, 45 refers to an intermediate bin, 46 refers to a material-delivering pipe, 461 refers to a material-delivering hard pipe, 462 refers to a material-delivering hose, 47 refers to a material-returning pipe, 5 refers to a monitoring mechanism, 51 refers to a wave height measurer, 52 refers to displacement sensor, 53 refers to a flowrate measurer, and 54 refers to an image collection apparatus.

DETAILED DESCRIPTION OF THE EMBODIMENTS

In combination with FIGS. 1-6, the present disclosure provides an experimental apparatus for simulating lifting operation of deep-sea mining. The apparatus is implemented in the following manner.

FIG. 1 illustrates an experimental apparatus for simulating lifting operation of deep-sea mining. The apparatus specifically includes an experimental box 1, a wave-making mechanism 2, a flowrate control mechanism 3, a mining simulation mechanism 4, and a monitoring mechanism 5. The wave-making mechanism 2 includes a control box 21 and a wave-pushing board 22 which are used for simulating waves. The flowrate control mechanism 3 includes a water pump 31, a motor 32, a grating board 33, and a manifold 34. A flowrate and a flow volume of water in the experimental box may be adjusted by the grating board 33 and the manifold 34. The mining simulation mechanism 4 includes an experimental ship model 41, a lifting pipe 42, a material-mixing box 43, a mineral slurry pump 44, an intermediate bin 45, a material-delivering pipe 46 and a material-returning pipe 47. The mining simulation mechanism 4 simulates lifting operation states by circulating slurry. The monitoring mechanism 5 includes a wave height measurer 51, a displacement sensor 52, a flowrate measurer 53 and an image collection apparatus 54, which are all used for detecting a dynamic influence of factors such as wave height and flowrate on the mining simulation mechanism particularly during the lifting operation.

Two supports are disposed at an upper portion of the experimental box 1 and a working table 11 is disposed on the support. The control box 11, the material-mixing box 43 and the mineral slurry pump 44 are all disposed on the working table 11. The experimental box 1 may be a large cuboid water storage tank, a volume of which is no less than 40 cubic meters. The support may be fixed at a rear side of a box body.

The wave-pushing board 22 of the wave-making mechanism 2 is disposed at a side wall of an upper portion of the experimental box 1. A motor, a decelerator and a wave height measurer are disposed in the control box 21, the motor is connected with the decelerator which is connected with a coupling. The control box 21 is connected with the wave-pushing board through the coupling. The experimental apparatus for simulating lifting operation of deep-sea mining simulates waves through the wave-making mechanism 2, so that the influence of the waves on the lifting process of mining is analyzed. The wave-making mechanism 2 drives the wave-pushing board 22 through the decelerator and the coupling so that the wave height and the wave speed are adjusted by adjusting the rotational speed.

The manifold 34 of the flowrate control mechanism 3 includes an inlet manifold and an outlet manifold. The inlet manifold and the outlet manifold are symmetrically arranged on both sides of the experimental box 1. The grating board 33 is disposed close to the branch surface of the manifold 34. The number of the through holes on the grating board 33 is equal to the number of the through holes on the surface of a manifold branch 341, a diameter of the through hole on the grating board 33 is equal to a diameter of an outlet of a manifold branch 341, and spacing between edges of the through holes on the grating board 33 is larger than the diameter of the through hole. A flow area of the inlet or the outlet is controlled by staggering the through holes on the grating board 33 and the surface of the manifold branch 341, so as to realize real-time adjustment to the flow volume and the flowrate. 10 branches may be divided from the branch of the manifold 34. Nine inlets or outlets of equal size are arranged on each branch in an equal spacing. Further, the inlets or the outlets of the inlet manifold and the outlet manifold are arranged along the same horizontal direction. A guideway groove is disposed on both sides of the surface of the manifold branch respectively, a screw structure is disposed in the guideway groove 36, and the grating board 33 moves along the guideway groove 36 through the screw structure. A waterproof servo motor 35 may be installed on an upper end of the guideway groove 36 so that the screw structure is driven by the waterproof servo motor 35. The flowrate control mechanism 3 may adjust the flowrate and the flow volume by the grating board 33 and the manifold 34, that is, control the incoming and outgoing speeds and flow volumes of water currents by blocking the manifold branch surface with the grating board 33, so that sea currents can be effectively simulated. In this case, the real time control of the sea currents is realized by controlling the movement of the grating board 33 through the screw structure.

The material-delivering pipe of the mining simulation mechanism 4 includes a material-delivering hard pipe 461 and a material-delivering hose 462. A lifting pipe 42 is disposed between the experimental ship model 41 and the intermediate bin 45, the mineral slurry pipe 44 is connected with the material-mixing box 43 through the material-delivering hard pipe 461, and the material-returning pipe 47 is disposed between the material-mixing box 43 and the experimental ship model 41. Cyclic use of materials is realized through pipe connection, and the deep sea mining process is simulated, thereby reducing experiment cost. An end of the material-delivering hose 462 is connected with the mineral slurry pipe 44 and the material-delivering hose 462 enters the experimental box 1 through the through hole of the experimental box 1 and connects with the intermediate bin. A mixer is disposed in the material-mixing box 43 of the mining simulation mechanism 4, and a discharge opening at a lower portion of the material-mixing box 43 is connected with the material-delivering hard pipe 461. The experimental ship model 41 freely floats on the water surface in the experimental box. The experimental ship model 41 is hinged with the lifting pipe 42 to facilitate moving the lifting pipe. In this way, the working stability of the lifting pipe 42 is guaranteed. The lifting pipe 42 is connected with the material-returning pipe 47 through the experimental ship model. The material-returning pipe is a hose so that the experimental ship model can move freely. With the experimental ship model 41, the lifting pipe 42, the material-mixing box 43, the mineral slurry pipe 44, the intermediate bin 45, and the material-delivering pipe 46 and the material-returning pipe 47 of the mining simulation mechanism, the slurry can be recycled and the lifting operation state is well simulated.

The monitoring mechanism 5 includes a wave height measurer 51, a displacement sensor 52, a flowrate measurer 53 and an image collection apparatus 54. The flowrate measurer 53 and the displacement sensor 52 are disposed on the intermediate bin 45 to measure and record a position offset and a water flow rate of the lifting pipe 42 in real time. The wave height measurer 51 of the monitoring mechanism 5 includes a buoy which is disposed at the liquid level of the experimental box. Specifically, the wave height measurer 51 may be an optical wave measurer for measuring and recording a wave height, a wave direction and a period. Two image collection apparatuses 54 of the monitoring mechanism 5 are disposed, and the image collection apparatus 54 is fixed at an inner side of the experimental box 1. In this way, the monitoring mechanism 5 realizes real-time monitoring for operation states.

Figure 6:
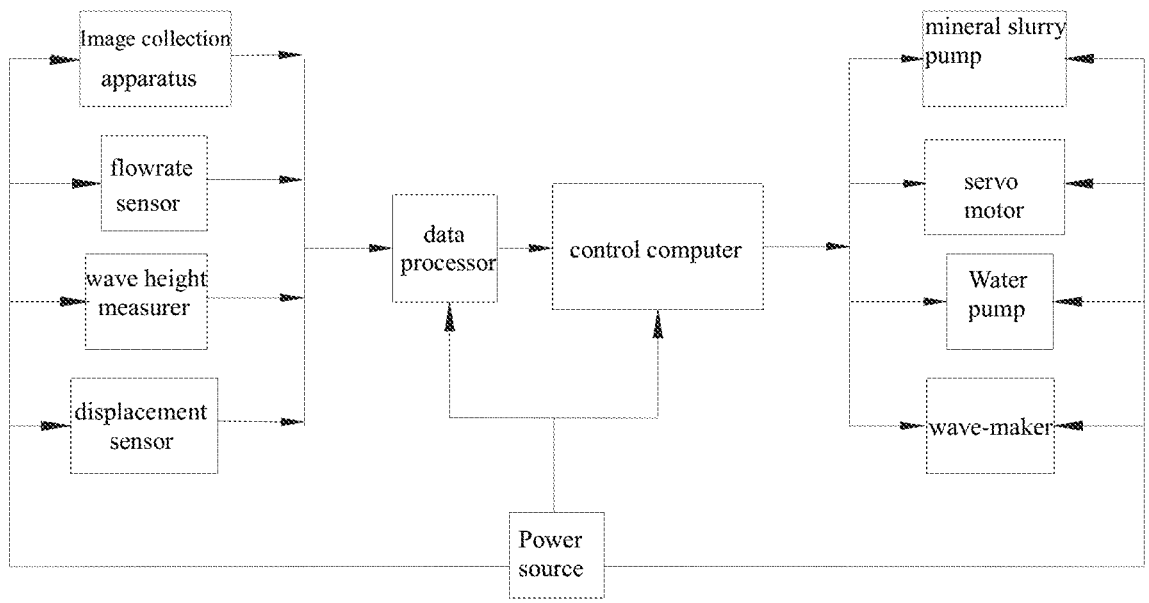
FIG. 6 is a schematic diagram illustrating a system control structure according to an example of the present disclosure.

Further, as shown in FIG. 6, the wave-making mechanism 2, the flowrate control mechanism 3, the mining simulation mechanism 4 and the monitoring mechanism 5 are all powered by a common power source. The wave height measurer 51, the displacement sensor 52, the flowrate measurer 53 and the image collection apparatus 54 are connected with a data processor through a data cable. The data processor is connected with a computer which controls the operations of the mineral slurry pump 44, the waterproof servo motor 35, water pump 31 and the control box 21.

Experiment is conducted with the experimental apparatus in the following operation manner.

At step 1, water is injected into the experimental box 1 and a proper amount of water and granules is added into the material-mixing box 43 and then the system is powered on.

At step 2, the motor in the control box 21 of the wave-making mechanism 2 is started to drive the wave-pushing board 22 to rotate. By adjusting the rotational speed, waves of different wave heights and wave speeds may be generated in the experimental box and thus waves of deep-sea mining are simulated.

At step 3, the water pump of the flowrate control mechanism 3 is started. Circulation of water in the experimental box is achieved by manifolds 34 on both sides under the drive of the water pump 31. At this time, water is replenished into the experimental box 1 again to a proper liquid level since water level of the experimental box is lowered due to water storage in the pipe. The servo motor 35 is started to drive the grating board 33 to move. The water flowrate and the water low volume are controlled by adjusting the overlapping area of the round holes on the grating board 33 and the inlets on the manifold 34, thereby realizing the purpose of simulating sea currents.

At step 4, the material-mixing box 43 and the mineral slurry pump 44 of the mining simulation mechanism 4 are started sequentially. The material-mixing box 43 mixes the materials evenly and then the mineral slurry pump 44 is started. The motor of the material-mixing box 43 drives mixing blades to rotate through the decelerator so as to mix the mixed materials. The evenly-mixed materials are transported to the material-delivering hose 462 through the material-delivering hard pipe 461 under the action of the mineral slurry pump and then transported into the intermediate bin 45. Under the action of the mineral slurry pump 44, the mixed materials in the intermediate bin 45 continue entering the material-mixing box 43 through the lifting pipe 42 and the material-returning pipe 47. At this step, the lifting operation of deep-sea mining can be effectively simulated, which conforms to the situation that inner flow exists in the lifting pipe and the weight of the intermediate bin gradually increases.

At step 5, when the above steps are performed, the flowrate measurer 53 measures and records water flowrate, the image collection apparatus 54 captures and records underwater spatial structural states and dynamic characteristics of the lifting pipe 42, the wave height measurer 51 measures and records wave height, wave direction and a period in real time, and the displacement sensor 52 detects a deflection angle and a displacement of the lifting pipe. The wave height measurer 51, the displacement sensor 52, the flowrate measurer 53, and the image collection apparatus transmit the monitoring data to the computer processor for storage.

Of course, the above descriptions are not intended to limit the present disclosure and the present disclosure is not limited to the above examples. Changes, modifications, additions or replacements made by those skilled in the art within the essential scope of the present disclosure shall all fall within the scope of protection of the present disclosure.

The invention claimed is:

1. An experimental apparatus for simulating lifting operation of deep-sea mining, comprising an experimental box, a wave-making mechanism, a flowrate control mechanism, a mining simulation mechanism and a monitoring mechanism; wherein, the wave-making mechanism comprises a control box and a wave-pushing board, the wave-pushing board is disposed at a side wall of an upper portion of the experimental box, the control box is connected with the wave-pushing board through a coupling; the flowrate control mechanism comprises a water pump, a motor, a grating board and a manifold, the manifold comprises an inlet manifold and an outlet manifold, and the grating board is disposed close to a surface of a manifold branch;

the mining simulation mechanism comprises an experimental ship model, a lifting pipe, a material-mixing box, a mineral slurry pump, an intermediate bin, a material-delivering pipe and a material-returning pipe; the material-delivering pipe comprises a material-delivering hard pipe and a material-delivering hose; the lifting pipe is disposed between the experimental ship model and the intermediate bin, the mineral slurry pump is connected with the material-mixing box through the material-delivering hard pipe, the material-returning pipe is disposed between the material-mixing box and the experimental ship model; an end of the material-delivering hose is connected with the mineral slurry pump and the material-delivering pipe enters the experimental box through a through hole of the experimental box and connects with the intermediate bin;

the monitoring mechanism comprises a wave height measurer, a displacement sensor, a flowrate measurer, and an image collection apparatus, and the flowrate measurer and the displacement sensor are disposed on the intermediate bin.

2. The apparatus according to claim 1, wherein two supports are disposed at an upper portion of the experimental box, and a working table is disposed on the supports; the control box, the material-mixing box and the mineral slurry pump are all disposed on the working table.

3. The apparatus according to claim 1, wherein a motor, a decelerator and a wave height measurer are disposed in the control box; the motor is connected with the decelerator which is connected with the coupling.

4. The apparatus according to claim 3, wherein the wave height measurer of the monitoring mechanism comprises a buoy which is disposed at a liquid level of the experimental box; the wave height measurer is an optical wave measurer used for measuring and recording a wave height, a wave direction and a period.

5. The apparatus according to claim 4, wherein two image collection apparatuses of the monitoring mechanism are disposed and the image collection apparatuses are fixed at an inner side of the experimental box.

6. The apparatus according to claim 1, wherein a mixer is disposed in the material-mixing box of the mining simulation mechanism, and a discharge opening at a lower portion of the material-mixing box is connected with the material-delivering hard pipe; the experimental ship model is hinged with the lifting pipe and the lifting pipe is connected with the material-returning pipe through the experimental ship model.

7. The apparatus according to claim 1, wherein a guideway groove is disposed on both sides of the surface of the manifold branch respectively, a screw structure is arranged in each guideway groove, and the grating board moves along the guideway grooves through the screw structure.

8. The apparatus according to claim 7, wherein a number of through holes on the grating board is equal to a number of through holes on the surface of the manifold branch, a diameter of each through hole on the grating board is equal to a diameter of an outlet of the manifold branch, and spacing between edges of the through holes on the grating board is larger than the diameter of the through holes.

* * * * *